(12) United States Patent
Tabet et al.

(10) Patent No.: US 9,264,968 B2
(45) Date of Patent: Feb. 16, 2016

(54) DEVICE TO DEVICE COMMUNICATIONS WITH CARRIER AGGREGATION

(71) Applicant: Apple Inc., Cupertino, CA (US)

(72) Inventors: Tarik Tabet, Los Gatos, CA (US); Ajoy K. Singh, Milpitas, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 14/095,292

(22) Filed: Dec. 3, 2013

(65) Prior Publication Data

US 2015/0156693 A1 Jun. 4, 2015

(51) Int. Cl.

| H04W 36/00 | (2009.01) |
|---|---|
| H04W 36/30 | (2009.01) |
| H04W 72/04 | (2009.01) |
| H04W 76/02 | (2009.01) |

(52) U.S. Cl.
CPC .............. *H04W 36/30* (2013.01); *H04W 72/04* (2013.01); *H04W 76/02* (2013.01); *H04W 76/023* (2013.01)

(58) Field of Classification Search
CPC ..... H04W 36/30; H04W 72/04; H04W 76/02; H04W 76/023
USPC ............ 455/426.1, 437, 435.1; 370/338, 252, 370/329, 331, 336, 254, 328
See application file for complete search history.

(56) References Cited

U.S. PATENT DOCUMENTS

| 9,042,938 B2 * | 5/2015 | Nimbalker .......... H04W 72/048 455/550.1 |
| 2011/0228666 A1 | 9/2011 | Barbieri et al. |
| 2012/0129540 A1 * | 5/2012 | Hakola ............... H04W 72/042 455/450 |
| 2013/0188552 A1 | 7/2013 | Kazmi et al. |
| 2013/0223352 A1 | 8/2013 | Sartori et al. |
| 2013/0272288 A1 * | 10/2013 | Li et al. .......................... 370/338 |
| 2013/0301438 A1 * | 11/2013 | Li et al. .......................... 370/252 |
| 2013/0324114 A1 * | 12/2013 | Raghothaman et al. ... 455/426.1 |
| 2014/0185530 A1 * | 7/2014 | Kuchibhotla ..... H04W 72/0446 370/329 |
| 2014/0269338 A1 * | 9/2014 | Jung ..................... H04L 5/0055 370/241 |

FOREIGN PATENT DOCUMENTS

| WO | 2013068788 | 5/2013 |
| WO | 2013091229 | 6/2013 |
| WO | 2013100831 | 7/2013 |
| WO | 2013167557 | 11/2013 |

OTHER PUBLICATIONS

International Search Report and Written Opinion from PCT/US2014/059225, issued Feb. 10, 2015, Apple Inc., pp. 1-12.
"3rd Generation Partnership Project; Technical Specification Group Services and Systems Aspects; Feasibility study for Proximity Services (ProSe)" 3GPP TR 22.803 V12.2.0, Jun. 2013, pp. 1-45.
"Device-to Device Communication as an Underlay to LTE-Advanced Networks", Klaus Doppler et al., Dec. 2009, pp. 42-49.

* cited by examiner

*Primary Examiner* — David Q Nguyen
(74) *Attorney, Agent, or Firm* — Meyertons Hood Kivlin Kowert & Goetzel, P.C.; Jeffrey C. Hood (57) ABSTRACT

Device-to-device (D2D) communications in conjunction with carrier aggregation. A base station (BS) may coordinate D2D communication between two wireless user equipment (UE) devices. A primary cell may be configured for communicating with each of the UEs. A secondary cell may be configured for D2D communication between the two UEs. The primary cell and the secondary cell may utilize different component carriers. Additionally, cross-carrier scheduling may be used, such that at least some control information for the secondary cell is communicated via the primary cell.

20 Claims, 5 Drawing Sheets

DEVICE TO DEVICE COMMUNICATIONS WITH CARRIER AGGREGATION

FIELD

The present application relates to wireless devices, and more particularly to a system and method for using carrier aggregation for device-to-device communications.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Some of these standards provide techniques for "infrastructure mode" communication, in which communication between endpoint devices is performed by way of one or more intermediate devices (e.g., access points or base stations), while some provide techniques for "peer-to-peer" or "device-to-device" communications, in which endpoint devices communicate directly with each other.

SUMMARY

Embodiments are presented herein of methods for configuring and performing device-to-device communication using carrier aggregation, and of devices configured to implement the methods.

According to the techniques described herein, a wireless device may communicate with a base station according to a radio access technology, such as LTE, to establish a primary cell, which may be used for control communications, data communications, etc.

At some point, it may be desired (e.g., for a voice call, file transfer, etc.) to establish a connection between the wireless device and another wireless device. If the other wireless device is within range for direct communication, it may further be desirable to establish the connection as a device-to-device connection.

In such a case, the base station may arrange with the wireless devices to establish a secondary cell which may be used for device-to-device communication between the wireless devices. The secondary cell may utilize a different channel than the primary cell.

In some instances, the secondary cell may utilize a channel which is on an entirely different frequency band. For example, if the primary cell is established on a channel of a licensed (e.g., for LTE use) frequency band, the secondary cell might be established on a channel of an unlicensed (e.g., ISM) frequency band, or another licensed (e.g., for a 2G or 3G cellular technology) frequency band.

The techniques described herein may be implemented in and/or used with a number of different types of devices, including but not limited to cellular phones, tablet computers, wearable computing devices, portable media players, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
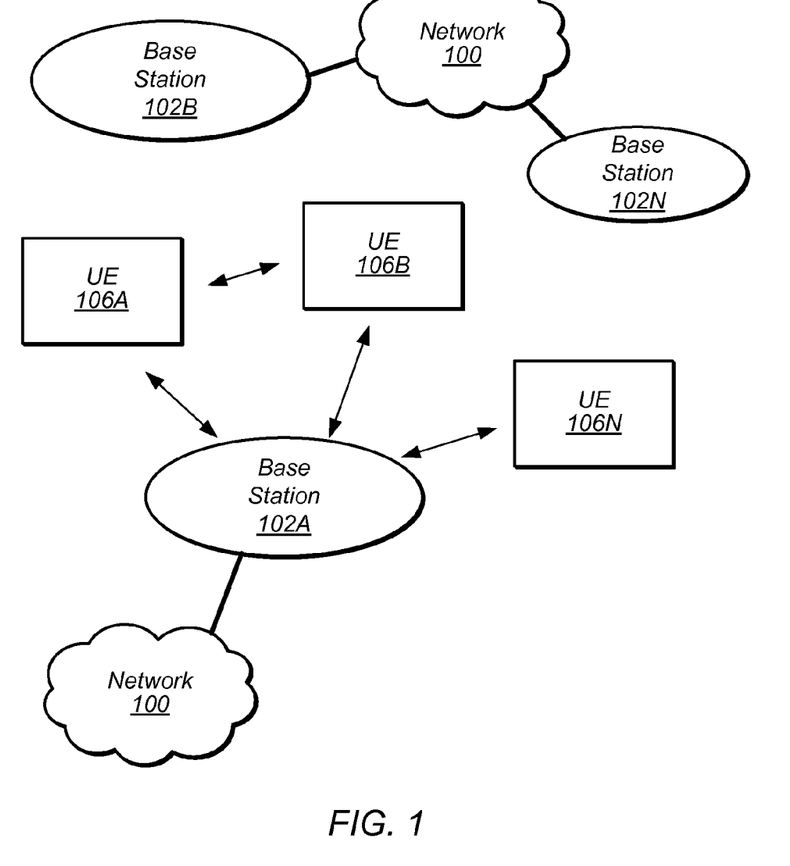
FIG. 1 illustrates an exemplary (and simplified) wireless communication system.
Figure 2:
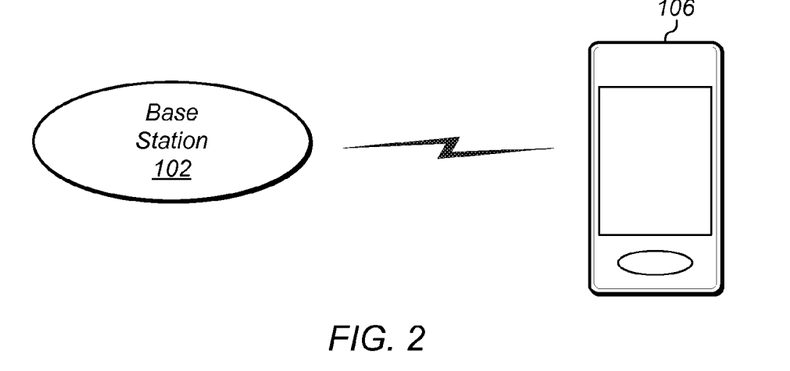
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102A which communicates over a transmission medium with one or more user devices 106A, 102B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B ... 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In addition to "infrastructure mode" communication in which UEs 106 communicate with each other and other networks/devices indirectly by way of base stations 102, some UEs may also be capable of communicating in a "peer-to-peer" (P2P) or "device-to-device" (D2D) mode of communication. In such a mode, UEs 106 such as UE 106A and UE 106B may communicate directly with each other (e.g., instead of by way of an intermediate device such as base station 102A). For example, LTE D2D, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further alternative, the UE 106 may include one or more radios which are shared between multiple wireless communication protocols, and one or more radios which are used exclusively by a single wireless communication protocol. Other configurations are also possible.

Figure 3:
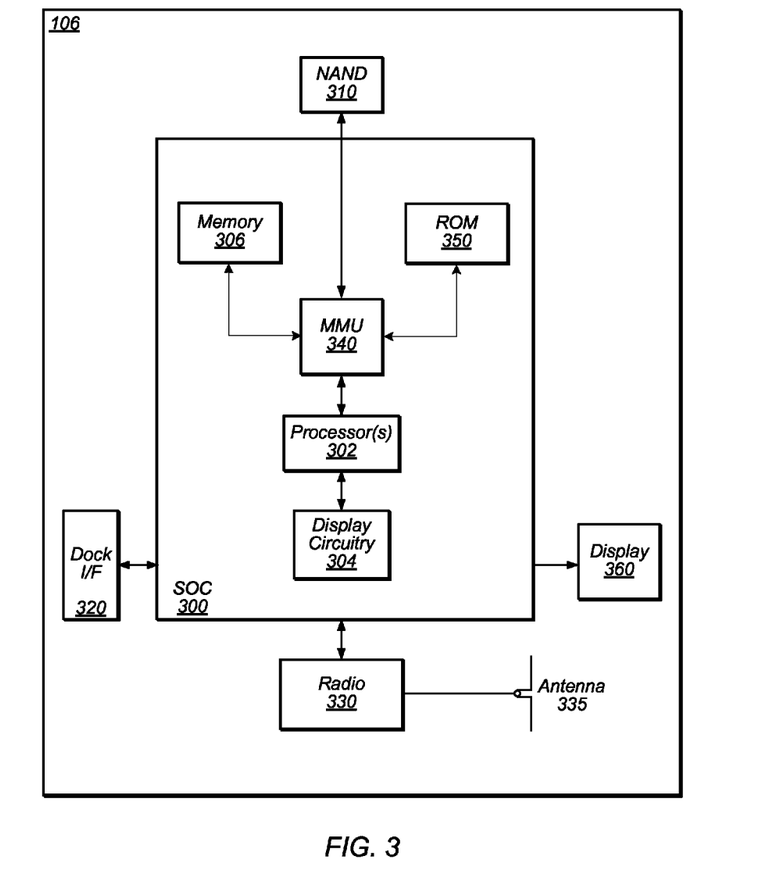
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing features for using carrier aggregation in conjunction with device-to-device communication, such as those described herein with reference to, inter alia, FIG. 7. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 7.

Figure 4:
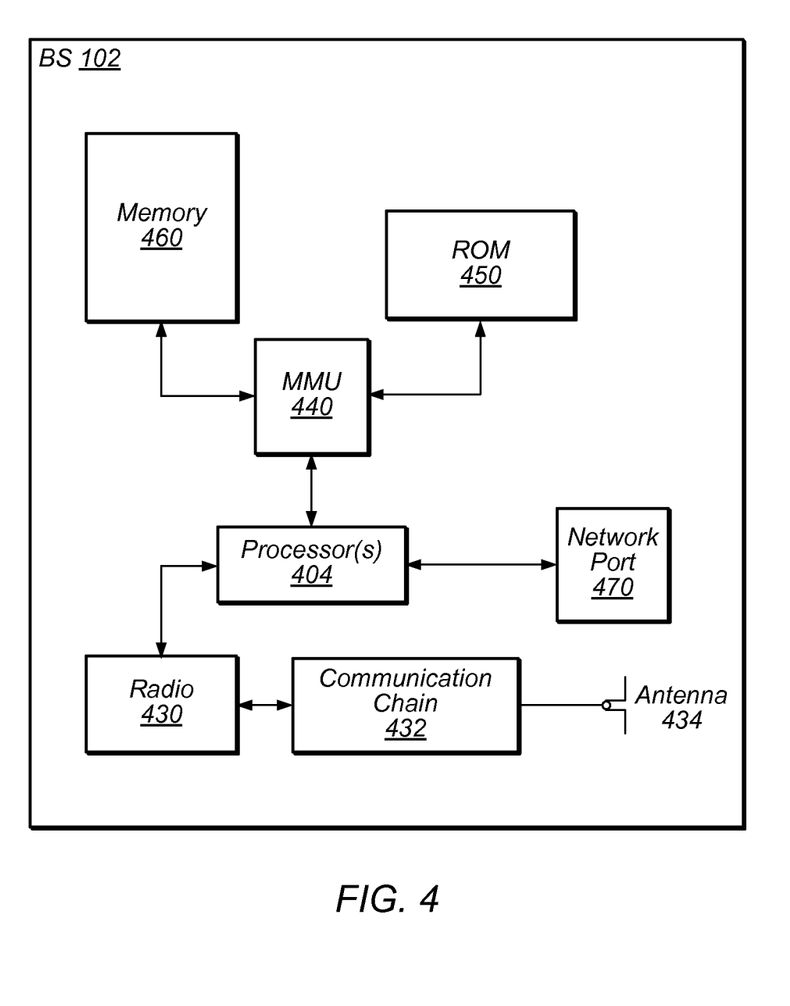
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, etc.

As described further subsequently herein, the BS 102 may include hardware and software components for implementing features for using carrier aggregation in conjunction with device-to-device communication, such as those described herein with reference to, inter alia, FIG. 7. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 7.

Figure 5:
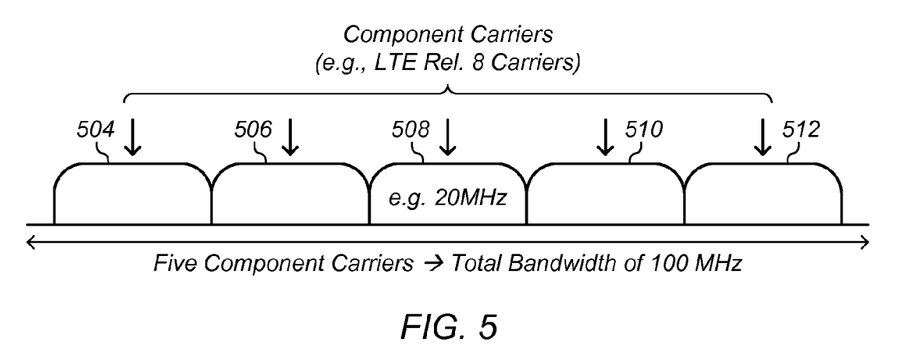
FIG. 5 illustrates an exemplary carrier aggregation scheme.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 7.

In the illustrated scheme, up to five component carriers (carriers 504, 506, 508, 510, 512) may be aggregated for a single user device (such one of the UEs 106 illustrated in and described with respect to FIGS. 1-3). Each component carrier may use a channel width of up to 20 MHz. As one possibility, each component carrier may be an LTE release 8 carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Figure 6:
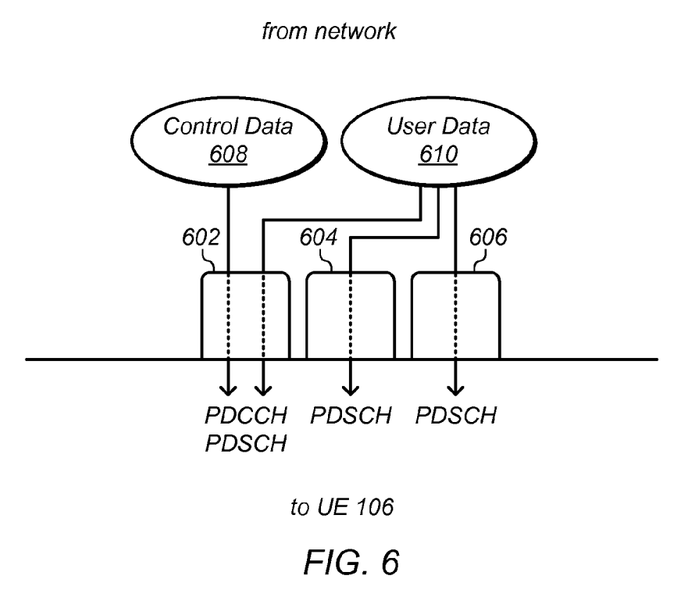
FIG. 6 illustrates an exemplary cross-carrier scheduling scheme.

FIG. 6—Cross-Carrier Scheduling

For systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one component carrier, while "secondary cells" might be implemented on any additional component carriers, such that some or all control information for the secondary cells is communicated by way of the primary cell.

Such a scheme may be referred to as "cross-carrier scheduling", and FIG. 6 illustrates one such exemplary scheme (e.g., which may be used in accordance with the LTE radio access technology). It should be noted that while the exemplary scheme illustrated in FIG. 6 and the associated description are provided by way of example as one possible manner of implementing a cross-carrier scheduling mechanism, they are not intended to be limiting to the disclosure as a whole. Numerous alternatives to and variations of these exemplary details are possible and should be considered within the scope of the present disclosure.

As shown, in the exemplary scheme a user device (e.g., a UE 106 such as illustrated in and described with respect to FIGS. 1-3) may have three active carriers as part of its connection to a network (e.g., by way of one or more base stations 102 such as illustrated in and described with respect to FIGS. 1-2 and 4), which may be implemented as a primary cell 602 and two secondary cells 604, 606. The network may provide control data 608 (e.g., for scheduling user data communications, performing mobility related functions, etc.) for all three cells by way of a control channel of the primary cell 602. For example, the control data 608 may be communicated by way of a physical downlink control channel (PDCCH) of the primary cell 602.

The network may provide user data 610 (e.g., application data for networking applications such as web browser applications, email applications voice call applications, video chat applications, game applications, etc.) to the UE 106 on any or all of the cells 602, 604, 606. For example, various portions of the user data 610 may be communicated by way of a physical downlink shared channel (PDSCH) of each of the primary cell 602 and the secondary cells 604, 606.

Thus, cross-carrier scheduling may be used in conjunction with carrier aggregation to centralize (at least a portion of) control communications on one cell. This technique may be used in many instances for infrastructure mode communications between a UE and a network, such as illustrated in the exemplary scheme of FIG. 6. In addition, cross-carrier scheduling may be used in conjunction with carrier aggregation to provide network-controlled hybrid infrastructure mode/device-to-device communication between two UEs 106. Various aspects of such a technique are further described herein below with respect to the method of FIG. 7.

Figure 7:
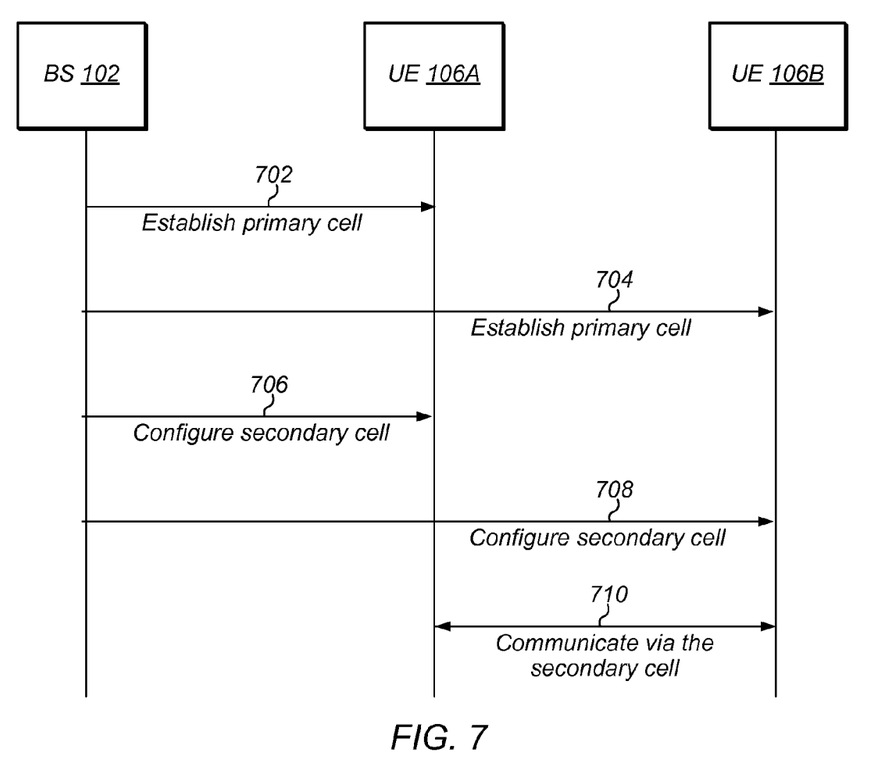
FIG. 7 is a signal flow diagram illustrating an exemplary method for device-to-device communication using carrier aggregation.

FIG. 7—Communication Flow Diagram

FIG. 7 is a communication/signal flow diagram illustrating a scheme for network controlled device-to-device communication using carrier aggregation. The scheme shown in FIG. 7 may be used in conjunction with any of the computer systems or devices shown in the above Figures, among other devices. As shown, the scheme may provide two user devices (e.g., such as UE 106A and UE 106B illustrated in FIG. 1, which may also be referred to herein as a "first UE" and a "second UE" respectively) with the capability to perform direct device-to-device communication under the control of a cellular network (e.g., by way of a base station, such as base station 102 illustrated in FIG. 1).

In various embodiments, some of the elements of the scheme shown may be performed concurrently, in a different order than shown, or may be omitted. Additional elements may also be performed as desired. As shown, the scheme may operate as follows.

In 702, the BS 102 may establish (e.g., configure) a primary cell with the first UE 106A. In 704, the BS 102 may establish a primary cell with the second UE 106B. In other words, the BS 102 may configure a primary cell for communicating with each of the first UE 106A and the second UE 106B. Each primary cell may be established according to a first radio access technology (RAT), such as LTE.

Each primary cell may use a particular channel (e.g., a frequency channel) as a carrier. Thus, the primary cell between the BS 102 and the first UE 106A may use a first channel as a carrier. The channels used for the primary cells may be the same channel (e.g., the BS 106 may communicate with multiple user devices using the same channel in a multiple access cellular communication system), or may be different channels.

In at least some instances, the channels selected for the primary cells may be in a licensed frequency band, which may also be referred to herein as a "first frequency band". For example, a cellular network provider may have licensed a particular frequency band (possibly specifically for use in conjunction with a particular radio access technology, such as LTE-A, LTE, WCDMA, CDMA2000, GSM, etc.), and may provide a cellular network which operates primarily within that licensed frequency band. Such a licensed frequency band may be subject to less external interference than an unlicensed frequency band. For example, an unlicensed frequency band might be subject to interference from other wireless communication technologies and/or from other cellular network operators utilizing a similar or the same wireless communication technology, whereas a licensed frequency band may not be subject to such external interference sources, e.g., if the licensed frequency band is licensed for the exclusive use of one particular cellular network provider.

Each primary cell may provide a user device with an infrastructure mode type communication link to the cellular network. For example, each primary cell may provide a connection to a core network, e.g., of a cellular service provider, with which a user of the UE 106 may have a subscription and/or other agreement to provide cellular service. The cellular network may thus provide connectivity between each user device and various services and/or devices coupled to the cellular network, such as other user devices, a public switched telephone network, the Internet, various cloud-based services, etc. Each primary cell may be used for control communications between a respective UE 106 and the BS 102, and may also be used for data (e.g., user data) communications.

Note that as part of such a cellular network, the base station 102 may operate in conjunction with numerous other base stations (which may provide other cells) and other network hardware and software to provide continuous (or nearly continuous) overlapping wireless service over a wide geographic area. At least in some instances, the first UE 106A and/or the second UE 106B may select a cell with the BS 102 to establish as the primary cell from among multiple cells within wireless communication range of the first UE 106A and/or second UE 106B, which may be provided by nearby base stations. For example, each user device may be capable of discovering, detecting signals from, and possibly communicating with some or all of multiple neighboring cells, e.g., depending on signal strength/quality, permission, technological interoperability, etc. The primary cell may be selected and configured/established on the basis of one or more signal strength and/or signal quality measurements of the primary cell and/or other nearby cells, among other possible criteria (e.g., wireless traffic congestion of the cell(s), operator of the cell(s), wireless technology according to which the cell(s) operate, etc.).

Note further that cell selection may be an initial cell selection, e.g., upon powering on a user device (or possibly after powering on a radio of a user device, e.g., upon exiting a limited-operation or "airplane mode"), according to some embodiments. Alternatively, the cell selection may be part of a cell re-selection procedure. For example, a user device might perform a cell re-selection procedure to select a new cell with better signal strength and/or quality as a primary cell based on experiencing degraded signal strength and/or quality on a previous primary cell, e.g., as a result of moving from a service area of the previous primary cell to a service area of the new primary cell.

Once a user device has established a primary cell and is thus communicatively linked with the cellular network, the user device may request that the network provide a communication link with another user device. For example, a user device (such as the first UE 106A) may initiate a voice call or video chat with another user device (such as the second UE 106B).

In order to connect user devices in response to such a request, the cellular network may determine the locations of each of the user devices. Frequently, the user devices may be distant from one another, and may accordingly be connected by way of various infrastructure components of the cellular network, including but not limited to base stations which provide primary cells for each of the user devices. In other words, user connectivity (e.g., to other devices, the Internet, cloud-based services, etc.) in such situations may be provided by way of a base station (or multiple base stations).

However, if the user devices are determined to be in relatively close proximity to each other (e.g., within a pre-determined or configurable distance threshold, being served by the same base station, or otherwise determined to potentially be within range to perform direct device-to-device communication), the network may determine to establish a direct device-to-device (D2D) connection between the user devices. Note that what is considered an acceptable proximity for D2D communication may depend at least in part on the D2D communication technology used. As one exemplary range, in conjunction with some wireless communication technologies, devices within approximately 1 km of each other may be considered potentially capable of performing D2D communication. Other ranges (e.g., shorter ranges such as 800 m, 500 m, etc., or longer ranges such as two 2 km, 3 km, etc., among various possibilities) are also possible.

It may be possible to establish such a D2D link between user devices in any of a variety of ways. As one possibility, direct D2D communication may be performed using Wi-Fi (e.g., Wi-Fi peer-to-peer). However, a cellular network may be unable to schedule or otherwise control such communication, which could result in interference between different device pairs and/or other Wi-Fi communication due to lack of coordination. Furthermore, Wi-Fi may have a relatively short range which limit its potential use and desirability, and may also be relatively power inefficient (e.g., may drain device battery relatively quickly) at longer ranges.

As another possibility, direct D2D communication could be performed using cellular communication, but in a decentralized manner. However, again in such a situation the cellular network would not have control of the radio resources of the devices participating in device-to-device communication, which may result in undesirable interference for other devices in the cellular system.

As still another possibility, direct D2D communication may be performed using cellular communication under network control. This may have the potential to impact network operations and the bandwidth/resources available, since the network may be scheduling resources for both normal (e.g., infrastructure mode) communications and D2D communications. However, if carrier aggregation is implemented in conjunction with D2D communication, for example such that D2D communication is performed on a secondary cell which is implemented on a different carrier than the primary cell, this may enable the network to control the D2D communication without restricting the resources available for infrastructure mode communications on the primary cell.

Thus, in 706 and 708, the BS 102 may configure the first UE 106A and the second UE 106B respectively to perform direct device-to-device communication with each other using a secondary cell. The secondary cell may use a different ("second") channel (e.g., a frequency channel) as a carrier than either of the primary cells. The second channel may be a channel on the same frequency band as the first channel, or may be on a different frequency band altogether. For example, the second channel may be on an unlicensed frequency band, such as an industrial-scientific-medical (ISM) frequency band, or another licensed frequency band. Note particularly that utilizing a channel on a different frequency band, such as an unlicensed frequency band, as the carrier for the secondary cell may enable the cellular network to control/coordinate the D2D communication without adding to the resource load on the first frequency band.

The BS 102 may configure the first UE 106A and the second UE 106B to utilize the secondary cell for D2D communication with each other via the primary cell. Configuring the secondary cell include any of a variety of steps, the nature of which may depend (among various possible factors) on a frequency band on which the second channel is located.

As part of configuring the secondary cell, the BS 102 may perform a selection process in order to select a channel as the "second channel" on which the secondary cell will be established. The selection process may include selecting the second channel from potential channels in multiple frequency bands, in at least some instances. For example, according to various possible implementations, the BS 102 might select the second channel from any combination of the first frequency band, one or more unlicensed (e.g., ISM) frequency bands, and/or one or more other licensed frequency bands (e.g., frequency bands on which the cellular network provider currently operates or previously operated a cellular network according to one or more previous generation radio access technologies).

If the secondary cell is (or might be) established on an unlicensed frequency band which may be subject to interference from other wireless communication (e.g., potentially from one or more other wireless communication technologies) which is not under network control, channel selection may include one or more scans/measurements of the unlicensed frequency band for one or more types of interference from wireless communication.

In particular, at least in some instances it may be desirable to check for Wi-Fi interference on an unlicensed frequency band if selecting a channel which is in that unlicensed frequency band as the second channel is under consideration. In such a case, the BS 102 might scan one or more Wi-Fi channels on a frequency band in which Wi-Fi communication may be commonly performed. The BS 102 may be equipped with Wi-Fi communication circuitry specifically for such a purpose (and/or for other purposes), if desired. Scanning the Wi-Fi channels may include measuring any of various channel condition metrics and/or metrics which may be used to gauge or infer interference levels, such as RSSI. As one possibility, the BS 102 may perform power spectrum density detection on such an unlicensed frequency band.

Based on scanning the Wi-Fi channels, the BS 102 may select one or more channels (e.g., Wi-Fi channels, or channels according to the first RAT (such as LTE channels) which may correspond/overlap in frequency with one or more of the Wi-Fi channels) in the unlicensed frequency band as potential channels on which the secondary cell could be established. The selected channel(s) may be those on which Wi-Fi interference has been determined to be less likely and/or prevalent, such as channels for which RSSI, SNR, or non IEEE interference on corresponding Wi-Fi channels are below a desired threshold.

Having selected one or more channels as potential carriers for the secondary cell, the BS 102 may provide an indication of such channels to each of the first UE 106A and the second UE 106B. For example, the BS 102 may provide a list of potential channels in an unlicensed frequency band to each of the first UE 106A and the second UE 106B in a configuration message (e.g., an RRC configuration object) via the respective primary cell for each of the first UE 106A and the second UE 106B. The UEs 106 may store such a list of potential channels and configure themselves to establish carriers on any of the potential channels upon receiving a further command/indication to do so from the BS 102. In other words, the UEs 106 may configure each channel on the list as a potential carrier, though they remain 'inactive' and unused as actual carriers until more explicitly activated.

In some cases, one or both of the first UE 106A and the second UE 106B may additionally provide feedback to the BS 102 (e.g., via the primary cell) with respect to such a list of potential channels in an unlicensed frequency band on which the secondary cell could be established. For example, one or both of the first UE 106A and the second UE 106B may perform one or more measurements (e.g., on interference/signal strength/RSSI scans/any of various other channel condition metrics) on some or all of the potential channels to determine channel conditions for those channels local to the first UE 106A and/or the second UE 106B, e.g., to confirm that those channels are also relatively free of interference in the vicinity of the first UE 106A and/or the second UE 106B. Thus, one or both of the first UE 106A and the second UE 106B might provide such channel condition information to the BS 102, provide a pruned (or possibly unpruned) list of supported channels, and/or otherwise provide feedback/information to the BS 102 with respect to the list of potential channels in the unlicensed frequency band on which the secondary cell could be established.

As another example, one or both of the first UE 106A and the second UE 106B may have limits to their wireless communication capabilities, as a result of which it may not be possible to perform communications according to the first RAT on a particular frequency band. If either or both of first UE 106A or the second UE 106B is unable to utilize any of the potential channels indicated by the BS 102, such information may be communicated (e.g., via the primary cell) to the BS 102, for example by way of a pruned list of supported channels, or a list of unsupported channels, or any of various other forms of feedback.

Note that for potential channels on licensed frequency bands, interference from wireless communication which is not under network control may not be an issue. For example, the network may have full control of the potential channels on that frequency band, and thus may already be aware of any wireless communication activity on such channels. Thus, if channels in one or more such licensed frequency bands are under consideration for selection as the second channel, it may be the case that no initial scan of channels on such bands may be necessary.

Once any scanning/channel measurements (if appropriate, e.g., if one or more unlicensed frequency bands are under consideration) have been performed by the BS 102, and possibly based additionally on any feedback received from the UEs 106 (e.g. again if appropriate), then the BS may select a channel (i.e., the second channel) on which to establish the secondary cell. The selection may be based on one or more of the scanning/channel measurements, any feedback received from UEs 106, and/or more typical network resource allocation considerations (e.g., known loading/use of network controlled communications and resource availability, among various considerations).

Once the second channel has been selected, the BS 102 may configure the UEs 106 to communicate directly via the secondary cell by providing an indication to each of the UEs 106 to establish the secondary cell on the second channel. Based on the configuration by the BS 102, the first UE 106A and the second UE 106B may establish the secondary cell for direct device-to-device communication with each other.

Note additionally that the secondary cell may be configured according to the first RAT, or according to a second (i.e., different) RAT. For example, if the cellular network operator has cellular networks which operate according to different (e.g., different generation) radio access technologies in parallel, it may be desirable in some instances (e.g. depending on network resource use distribution/availability) on a frequency band on which the second RAT operates, and thus may configure the secondary cell according to the second RAT. As one such example, the first RAT might be LTE, while the second RAT might be HSPA; if the second RAT is an older wireless communication technology (e.g., a 3G RAT such as HSPA) while the first RAT is a newer wireless communication technology (e.g., LTE), it is possible that the frequency band on which the network according to the second RAT operates may have less loading/more available capacity (e.g., since many user devices may preferentially use the newer wireless communication technology), and thus establishing/configuring the secondary cell according to the second RAT may be an efficient use of network resources.

In 710, the first UE 106A and the second UE 106B may communicate with each other directly via the secondary cell. The D2D communication may be performed using the same wireless communication technology (the first RAT) as used for communicating with the BS 102 via the respective primary cell of each of the first UE 106A and the second UE 106B, or may be performed according to a different wireless communication technology (the second RAT), e.g., if the secondary cell is configured according to the second RAT.

In some instances, the cellular network may utilize cross-carrier scheduling to allocate D2D resources to the first UE 106A and the second UE 106B. For example, the BS 102 may provide scheduling information (e.g., uplink and/or downlink grants) for scheduling secondary cell resources for D2D communication to each of the first UE 106A and the second UE 106B via each respective primary cell. Using cross-carrier scheduling may enable the network to retain control of resource allocation for D2D communication, which may facilitate more efficient resource use, e.g., as the network may be able to coordinate different pairs of UEs to avoid interference with each other.

Note that user plane scheduling for D2D communication may operate differently than for infrastructure mode communication. For example, at least in some instances, a base station 102 may schedule uplink and downlink communication with a UE 106 based (at least in part) on the buffer status of its local buffer and the uplink buffer of the UE 106 (e.g., based on a UE's buffer status report); downlink and uplink communication may be scheduled based on what data is available to transmit in the downlink and uplink direction respectively. However, in the case of D2D communication, the base station 102 may not have any downlink data to transmit to the UE 106, nor the UE 106 any uplink data to transmit to the BS 102, since the D2D communication may be performed directly between two UEs 106.

As one possibility, a BS 102 may simply allocate resources to UEs 106 performing D2D communication on an ongoing basis. In such a case, a UE 106 may send a trigger/indication to the BS 102 in order to establish D2D communication with another UE 106, on the basis of which the BS 102 may establish radio resources for the D2D communication. The BS 102 may then periodically allocate resources to the UE 106 for D2D communication on the secondary cell until a further indication is received from the UE 106 to cease the D2D communication with that particular UE 106 (e.g., an indication that it is no longer interested in D2D communication with that selected peer).

As another possibility, UEs 106 participating in D2D communication under the control of a BS 102 may transmit "D2D buffer status reports" (e.g., analogous to buffer status reports for infrastructure mode communication) to the BS 102 (e.g., via a control channel of the primary cell) to indicate how much data is available at each UE 106 for transmission to the other UE 106. The BS 102 may then allocate resources to each UE 106 for D2D communication based on such information. Note that numerous alternatives, additions, and/or modifications to these exemplary D2D user plane scheduling techniques are also possible, and may be used as desired.

Since in the case of cross-carrier scheduling control information may be provided to each UE 106 for both the primary cell and the secondary cell via the primary cell, it may be desirable to differentiate between grant/resource allocation for the secondary cell (e.g., D2D grant/resource allocation) from grant/resource allocation for the primary cell. As one possibility for achieving such differentiation (e.g., in an LTE cellular system), the cyclic redundancy check (CRC) of the primary cell physical downlink control channel (PDCCH) may be encoded with a D2D specific cell radio network temporary identifier (C-RNTI) for D2D related control information, while a normal C-RNTI may be used for non-D2D related control information.

In other instances, the cellular network may not utilize cross-carrier scheduling. For example, if the secondary cell operates according to a different RAT than the primary cell, scheduling and other control functions for the secondary cell may be controlled by the network operating according to the second RAT, or may be controlled directly by the UEs 106. Note that in such a scenario, it may still be the case that the primary cells are used for discovery and helping to set up the secondary cell.

While the secondary cell is active, the UEs 106 may monitor one or more link quality metrics (e.g., signal strength and/or quality metrics such as RSRP and/or RSRQ, packet loss rate, etc.) of the secondary cell, and may report the results (e.g., in a link quality report) of such monitoring back to the BS 102 (e.g., via the primary cell). Such monitoring and reporting may be controlled/configured by the BS 102 (e.g., using indications/requests transmitted via the primary cells) and/or may be performed by the UEs 106 in a manner controlled by the UEs 106. Note additionally that such monitoring and reporting may be time based (e.g., periodically performed at certain preconfigured or dynamically configured intervals), event based (e.g., activated by certain events), or a combination of time based and event based.

Based at least in part on the link quality of the secondary cell, the BS 102 may determine whether or not to initiate handover from the secondary cell. As some point, the link quality of the second channel may fall below a desired level. In such a case, the BS 102 may determine to handover the secondary cell to a different carrier. Determining that the link quality of the second channel has deteriorated may be performed in any of a variety of ways; as one example, if any monitored link quality metrics fall below a preconfigured threshold, this may be consideration that link quality of the second channel has deteriorated to an undesirable level. In such a situation, the BS 102 may be determine to switch or hop the D2D communication to a different D2D channel or to an infrastructure mode link (e.g., if the user devices are no longer within range to directly communicate), and may configure handover accordingly.

Selection of handover characteristics/a handover technique may be similar in nature to initial selection of the second channel in some or all ways, if desired. For example, any of various potential D2D channels on any of various possible frequency bands (e.g., licensed and/or unlicensed, for use in conjunction with one or both of the first RAT or the second RAT) as well options for converting the D2D link to infrastructure mode links (e.g., via the BS 102 and/or one or more other base stations), may be considered and evaluated (e.g., based on channel scans, device feedback, a network resource management algorithm and/or various other considerations), and the details of the handover may be determined accordingly.

Note that even if only one of the UEs 106 is experiencing degraded conditions and causes a handover of the secondary cell to be initiated, the BS 102 may indicate (e.g., provide a handover command, such as RRC configuration information, via the primary cell) to both the first UE 106A and the second UE 106B to perform handover as determined by the network in such a case, since both the first UE 106A and the second UE 106B are utilizing the secondary cell for the D2D communication. This may contrast with an infrastructure mode link, in which handover of one user device from one cell of a cellular network to another may not affect any device(s) communicating with that user device via the cellular network.

It should also be noted that even in the case of handover from a D2D link to an infrastructure mode link, IP addresses assigned to the UEs 106 by the core network (e.g. an evolved packet core (EPC) of an LTE network) may be the same as the IP addresses assigned to the UEs 106 on the D2D link, e.g., to ensure continuity. Such IP address continuity may enable seamless switching of D2D communication to infrastructure mode communication, and vice versa. For example, if the IP address of a UE 106 doesn't change due to switching from D2D mode to infrastructure mode communication, active applications of the UE 106 may be able to continue to function without interruption when D2D communication link is switched to an infrastructure mode communication link, and vice versa.

Once the UEs 106 have received an indication to perform handover with details of the handover, each of the first UE 106A and the second UE 106B may perform handover (e.g., according to the provided details in the indication).

Thus, according to the scheme of FIG. 7, UEs may be able to perform D2D communication under full network control. Furthermore, by utilizing carrier aggregation techniques the D2D communication may be performed on a different carrier than an infrastructure mode link to the cellular network. This may potentially avoid adding to loading of a network operator's licensed frequency band(s), e.g., if an unlicensed frequency band is used for the D2D communication, and more generally may enable a network operator to distribute available resources (potentially including one or more frequency bands licensed by the network operator and one or more unlicensed frequency bands) in an efficient and cost-effective manner.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first wireless user equipment (UE) device, comprising:
a radio, comprising one or more antennas configured for wireless communication;
a processing element operably coupled to the radio;
wherein the radio and the processing element are configured to:
establish a primary cell for control and data communications with a base station, wherein the primary cell uses a first channel as a carrier;
receive, via the primary cell, one or more uplink and/or downlink grants for communicating with the base station using the primary cell, wherein the one or more uplink and/or downlink grants for communicating with the base station using the primary cell are encoded with a first cell radio network temporary identifier (C-RNTI);
receive information configuring a secondary cell for device-to-device (D2D) communications between the first UE device and a second UE device, wherein the secondary cell uses a second channel as a carrier, wherein the second channel is different than the first channel;
receive, via the primary cell, one or more uplink and/or downlink grants for communicating directly with the second UE device using the secondary cell, wherein the one or more uplink and/or downlink grants for communicating directly with the second UE device using the secondary cell are encoded with a second C-RNTI; and
communicate directly with the second UE device using the secondary cell according to the one or more uplink and/or downlink grants for communicating directly with the second UE device using the secondary cell.

2. The first UE device of claim 1, wherein the radio and the processing element are further configured to:
determine at least one channel condition metric for the second channel; and
transmit information comprising the at least one channel condition metric for the second channel to the base station via the primary cell.

3. The first UE device of claim 1,
wherein the first channel is a channel on a first frequency band,
wherein the second channel is a channel on a second frequency band,
wherein the radio and the processing element are further configured to:
receive information indicating a plurality of channels of the second frequency band from the base station via the primary cell; and
transmit information indicating that the UE device supports communication on at least one of the plurality of channels of the second frequency band to the base station via the primary cell, wherein the at least one of the plurality of channels of the second frequency band comprises at least the second channel.

4. The first UE device of claim 3, wherein the radio and the processing element are further configured to:
perform one or more channel measurements on each of the plurality of channels of the second frequency band; and
transmit information comprising results of the one or more channel measurements on each of the plurality of channels of the second frequency band to the base station via the primary cell.

5. The first UE device of claim 1,
wherein communications between the first UE device and the base station on the primary cell are performed using a first radio access technology,
wherein communications between the first UE device and the second UE device on the secondary cell are also performed using the first radio access technology.

6. The first UE device of claim 5,
wherein the first radio access technology is LTE.

7. The first UE device of claim 1,
wherein communications between the first UE device and the base station on the primary cell are performed using a first radio access technology,
wherein communications between the first UE device and the second UE device on the secondary cell are performed using a second radio access technology.

8. The first UE device of claim 1,
wherein the second channel is a channel on a different frequency band than the first channel.

9. The first UE device of claim 1,
wherein the first channel is a channel on a licensed frequency band, wherein the second channel is a channel on an unlicensed frequency band.

10. A method for operating a wireless user equipment (UE) device, the method comprising:
establishing a primary cell with a base station according to a first radio access technology (RAT), wherein the primary cell uses a first component carrier;
receiving control information associated with data communication via the primary cell, wherein the control information associated with data communication via the primary cell is encoded with a first cell radio network temporary identifier (C-RNTI);
receiving information configuring a secondary cell from the base station, wherein the information is received via the primary cell, wherein the secondary cell provides a device-to-device (D2D) communication link according to the first RAT between the first UE device and a second UE device, wherein the secondary cell uses a second component carrier;
receiving, via the primary cell, at least one uplink or downlink grant for the D2D communication link, wherein the at least one uplink or downlink grant for the D2D communication link is encoded with a second C-RNTI; and
performing D2D communication with the second UE device according to the first RAT via the secondary cell during the at least one uplink or downlink grant for the D2D communication link.

11. The method of claim 10, the method further comprising:
monitoring one or more link quality metrics of the secondary cell;
transmitting at least one link quality report for the secondary cell to the base station via the primary cell; and
receiving an indication to perform handover of the D2D communication link from the base station via the primary cell.

12. The method of claim 11, wherein the indication to perform handover of the D2D communication link indicates one of:
to move the secondary cell to a different carrier in a same frequency band and retain the D2D communication link according to the first RAT;
to move the secondary cell to a different carrier in a different frequency band and retain the D2D communication link according to the first RAT;

to move the secondary cell to a different carrier in a different frequency band and modify the D2D communication link to operate according to a second RAT; or to convert the D2D communication link to an infrastructure mode communication link, wherein the method further comprises performing handover of the D2D communication link according to the indication to perform handover of the D2D communication link.

13. The method of claim 12, wherein an IP address for first UE device if the D2D communication link is converted to the infrastructure mode communication link is identical to an IP address assigned to the first UE device for the D2D communication link.

14. A base station (BS), comprising:

a radio, comprising one or more antennas configured for wireless communication;

a processing element operably coupled to the radio;

wherein the radio and the processing element are configured to:

configure a primary cell for communicating with each of a first user equipment (UE) device and a second UE device;

configure a secondary cell for device-to-device (D2D) communication between the first UE device and the second UE device; and     transmit control information allocating secondary cell resources for the D2D communication between the first UE device and the second UE device to each of the first UE device and the second UE device via the respective primary cell for each of the first UE device and the second UE device, wherein the secondary cell resources comprise at least uplink and downlink grants for the D2D communication between the first UE device and the second UE device,         wherein, for each of the first UE device and the second UE device, the control information allocating secondary cell resources for the D2D communication is encoded with a different C-RNTI than control information allocating primary cell resources.

15. The BS of claim 14, wherein the secondary cell uses a different channel than the primary cells for the first UE device and the second UE device.

16. The BS of claim 14, wherein the primary cells for the first UE device and the second UE device are on a first frequency band, wherein the secondary cell is on a second frequency band, wherein the radio and the processing element are further configured to:

scan a plurality of channels on the second frequency band, wherein scanning the plurality of channels comprises measuring at least one channel condition metric for each of the plurality of channels;

select at least a subset of the plurality of channels based at least in part on results of measuring the at least one channel condition metric for each of the plurality of channels;

transmit information indicating the at least a subset of the plurality of channels to the first UE device and the second UE device via the respective primary cell for each of the first UE device and the second UE device;

receive information from each of the first UE device and the second UE device indicating which of the at least a subset of the plurality of channels are supported by each of the first UE device and the second UE device via the respective primary cell for each of the first UE device and the second UE device; and     select a channel of the second frequency band for the secondary cell based at least in part on the information from each of the first UE device and the second UE device indicating which of the at least a subset of the plurality of channels are supported by each of the first UE device and the second UE device.

17. The BS of claim 16, wherein the second frequency band is an unlicensed ISM band, wherein measuring at least one channel condition metric for each of the plurality of channels comprises measuring interference from Wi-Fi communication on each of the plurality of channels.

18. The BS of claim 14, wherein the radio and the processing element are further configured to:

receive link quality information for the secondary cell from each of the first UE device and the second UE device via the respective primary cell for each of the first UE device and the second UE device;

determine whether or not to initiate handover from the secondary cell based at least in part on the link quality information; and     transmit a handover command to both the first UE device and the second UE device via the respective primary cell for each of the first UE device and the second UE device upon determining to initiate handover from the secondary cell.

19. The BS of claim 18, wherein the radio and the processing element are further configured to:

select a handover technique upon determining to initiate handover from the secondary cell, wherein the handover technique comprises one of:

hopping the secondary cell to another D2D channel in a same frequency band;

hopping the secondary cell to another D2D channel in a different frequency band; or         moving the first UE device and the second UE device from a D2D communication link to infrastructure mode communication links.

20. The BS of claim 14, receive one or more D2D buffer status reports from each of the first UE device and the second UE device; and allocate the uplink and downlink grants for the D2D communication between the first UE device and the second UE device based at least in part on the one or more D2D buffer status reports.

\* \* \* \* \*